US006304796B1

(12) United States Patent
Ding

(10) Patent No.: US 6,304,796 B1
(45) Date of Patent: Oct. 16, 2001

(54) VENDING MACHINE OPERATED BY A CHIP CARD

(76) Inventor: Linda Ding, 5 Fl., No. 43, Lane 50, Yuantung St., Lungching Hsian, Taichung Hsien (TW)

( * ) Notice: Subject to any disclaimer, the term of this patent is extended or adjusted under 35 U.S.C. 154(b) by 0 days.

(21) Appl. No.: 09/679,264

(22) Filed: Oct. 4, 2000

(30) Foreign Application Priority Data

Dec. 7, 1999 (TW) ............................................ 88220783

(51) Int. Cl.[7] ............................................ G06F 17/00
(52) U.S. Cl. ......................... 700/237; 700/236; 700/244
(58) Field of Search ................................ 700/244, 236, 700/237

(56) References Cited

U.S. PATENT DOCUMENTS

| | | | | |
|---|---|---|---|---|
| 3,750,931 | | 8/1973 | Souza . | |
| 4,801,375 | | 1/1989 | Padilla . | |
| 5,382,781 | * | 1/1995 | Inoue | 235/384 |
| 5,440,108 | * | 8/1995 | Tran et al. | 235/381 |
| 5,450,938 | * | 9/1995 | Rademacher | 194/206 |
| 5,608,643 | * | 3/1997 | Wichter et al. | 364/479.14 |
| 5,728,999 | * | 3/1998 | Teicher | 235/381 |
| 5,734,150 | * | 3/1998 | Brown et al. | 235/381 |
| 5,778,067 | * | 7/1998 | Jones et al. | 380/24 |
| 5,817,231 | | 10/1998 | Souza . | |
| 5,818,030 | * | 10/1998 | Reyes | 235/492 |
| 5,892,211 | * | 4/1999 | Davis et al. | 235/380 |
| 5,901,303 | * | 5/1999 | Chew | 395/400 |
| 5,914,471 | * | 6/1999 | Van De Pavert | 235/380 |
| 5,930,771 | * | 7/1999 | Stapp | 705/28 |
| 5,941,363 | * | 8/1999 | Partyka et al. | 194/217 |
| 5,955,718 | * | 9/1999 | Levasseur et al. | 235/381 |
| 6,021,626 | * | 2/2000 | Goodman | 53/438 |
| 6,032,857 | * | 3/2000 | Kitagawa et al. | 235/379 |

OTHER PUBLICATIONS

West, Stephen, Card Technology Overview, Journal :ID Systems European Edition, v2 n4, pp20–22, 24, Sep. 1994.*

* cited by examiner

*Primary Examiner*—Christopher P. Ellis
*Assistant Examiner*—Michael E. Butler
(74) *Attorney, Agent, or Firm*—Kolisch Hartwell Dickinson McCormack & Heuser

(57) ABSTRACT

A vending machine operated by a chip card includes a housing having a window to display goods to be sold, multiple selection buttons (13) associated with the appropriate goods, a display to show the sum of money recorded on the chip card and an access bin from which the goods are obtained from the vending machine. The vending machine further includes an electronic control unit for storing information about prices for the goods, an inductive card reader for reading information from and writing information on the chip card by induction, a checker for checking the stock of the goods, a transporter for transferring the goods to the access bin, multiple indicators to show what goods are out of stock, and multiple lamps to indicate what goods are available based on the sum of money recorded on the chip card. The inductive card reader is electrically connected to the electronic control unit to which the checker, the transporter, the indicators, the buttons and the lamps are electrically connected.

8 Claims, 5 Drawing Sheets

VENDING MACHINE OPERATED BY A CHIP CARD

BACKGROUND OF THE INVENTION

1. Field of the Invention

The present invention relates to a vending machine, and more particularly, to a vending machine operated by a chip card by induction.

2. Description of Related Art

Early vending machines were coin-operated for selling small articles, such as beverages, candy bars or cigarettes. Faults with these vending machines were generally associated with the coin mechanism. They generally failed to identify counterfeit or invalid coins, and coins got stuck in the slots.

Vending machines were developed later, which were operated by inserting a suitable magnetic card into the machine. The card had a magnetic strip from which the vending machine could read the sum of money remaining on the card, and onto which the vending machine could deduct the amount of the purchase and record the remaining sum of money after the transaction. Even though the improved conventional vending machine does not suffer from accepting counterfeit coins, it still has the following disadvantages:

1. wearing out the card:

Because the card must be inserted into and engaged with parts of the vending machine each time it is used, it will be scraped or worn gradually, especially at the magnetic surface. Eventually, information can hardly be read from the card.

2. having high maintenance cost:

Because conventional vending machines, generally in public places such as near schools or shopping centers, are operated in independent mode, a lot of replenishment and repair personnel are required to travel among them to examine whether the goods are out of stock or the vending machines th,*,elves are out of order.

3. timely repairing and restocking the vending machines in a timely manner:

Because the replenishment is done manually at regular intervals, such as every three days, machines out of order or needing to be restocked sit idle until the normal rounds.

Therefore, it is an objective of the invention to provide an improved vending machine operated by communicating with a chip card to mitigate and obviate the aforementioned problems.

SUMMARY OF THE INVENTION

The object of the present invention is to provide a vending machine that is operated by communicating by induction with a chip card that will not be worn by the machine.

Another object of the present invention is to provide a vending machine that communicates with an administrative center without a inspection.

Still another object of the present invention is to provide a vending machine that can inform the administrative center of the problem with the vending machine and depleted stock in a timely manner.

Other objects advantages and novel features of the invention will become more apparent from the following detailed description when taken in conjunction with the accompanying drawings.

DETAILED DESCRIPTION OF THE PREFERRED EMBODIMENT

Figure 1:
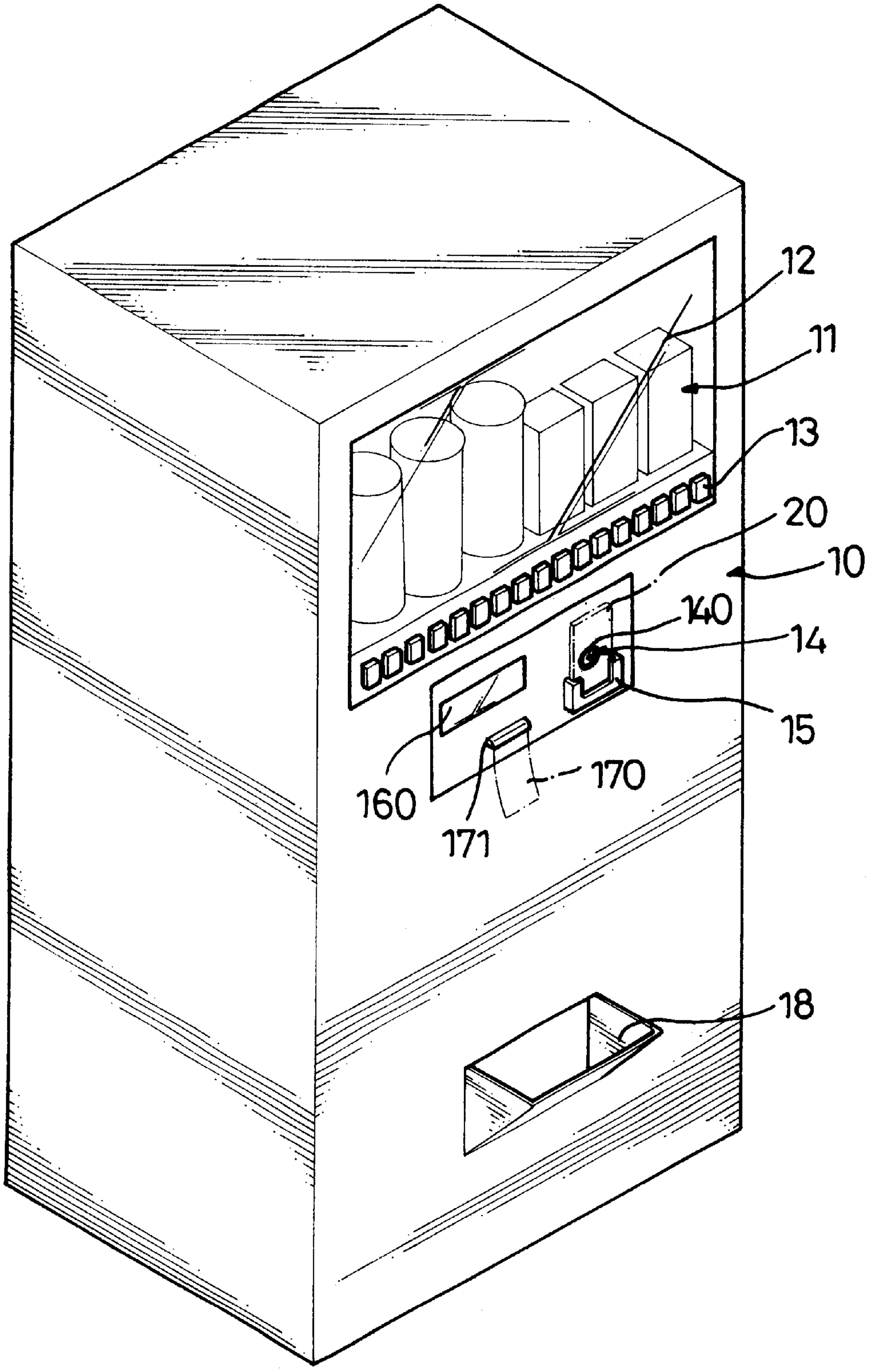
FIG. 1 is a perspective view of a vending machine in accordance with the present invention.
Figure 2:
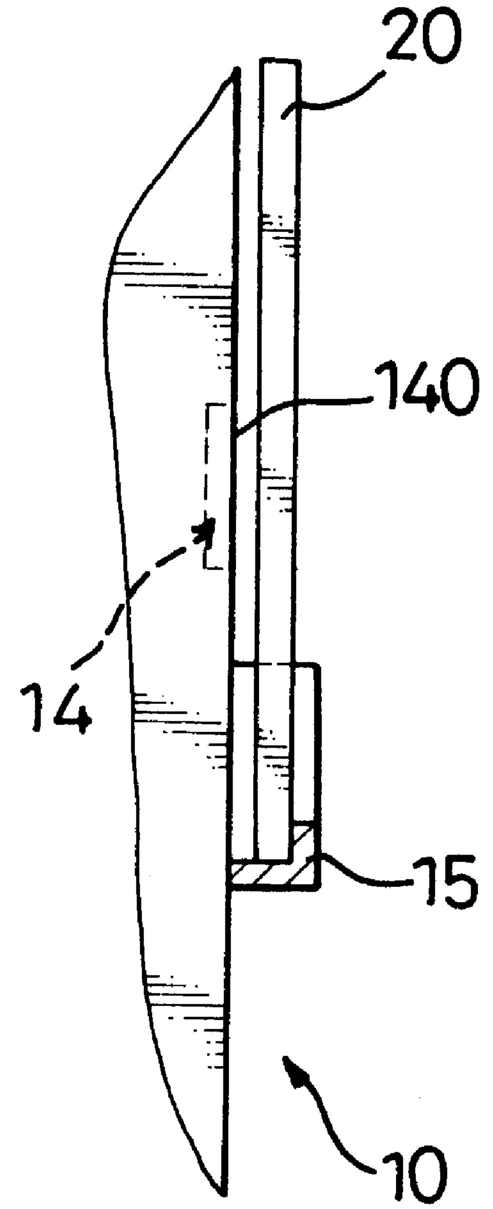
FIG. 2 is a cross-sectional side plan side view of the card reader and chip card in the vending machine in FIG. 1.

With reference to FIGS. 1 and 2, a vending machine in accordance with the present invention includes a housing (10), multiple selection buttons (13) and an induction card reader (14). The housing (10) has a window (11) to show goods (12) to be sold. The selection buttons (13) correspond to individual goods (12) available in the vending machine. The inductive card reader (14) has an inductive read/write head (140) to receive information from and transmit information to the chip card (20) by induction.

The chip card (20) is positioned near the reader (14), preferably in a U-shaped stand (15). The sum of money recorded on the card (20) is shown on a display (160), and a printed receipt (170) is ejected out of the housing (10) through a slot (171).

The dispensed goods (12) are obtained from an access bin (18) in the vending machine.

Figure 3:
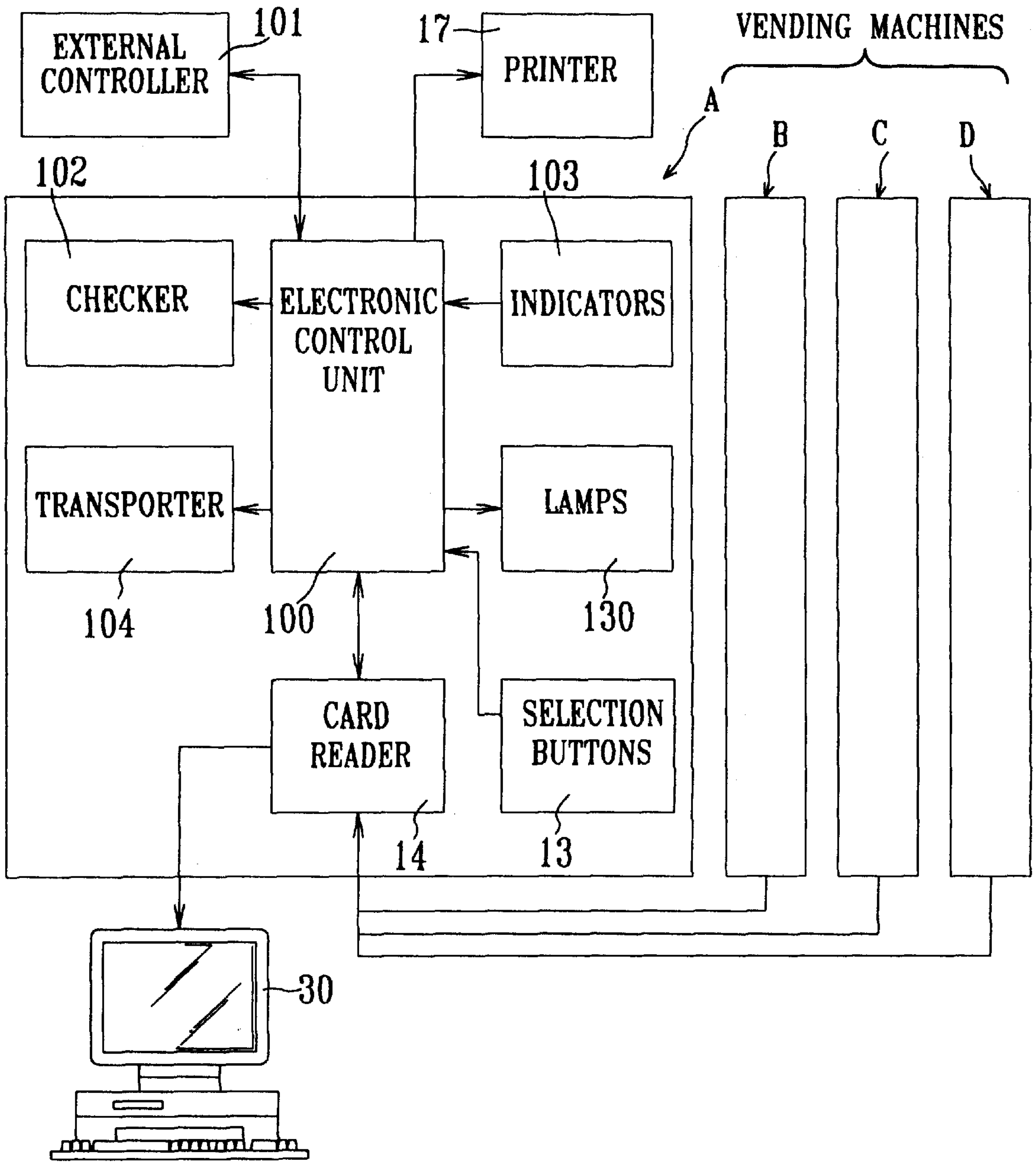
FIG. 3 is a diagram of international construction of the vending machine of FIG. 1, showing the vending machine in communication with a host computer of an administrative center via a communication module.

With reference to FIG. 3, the vending machine further includes an electronic control unit (100), an external controller (101), a checker (102), a transporter (104), a printer (17) and lamps (130). The electronic control unit (100) stores prices for the goods (12). The external controller (101) is electrically connected to the electronic control unit (100) via a cable to update the information stored on the electronic control unit (100). The checker (102) checks the quantity of the goods (12) in the vending machine. The indicators (103) indicate that specific goods (12) are out of stock. The transporter (104) transfers the selected goods (12) to the access bin (18). The printer (17) prints the transaction receipt (70). The lamps (130) are enclosed in the buttons (13) and indicate which goods (12) are available.

The card reader (14) is electrically connected to the electronic control unit (100) to which the external controller (101) the checker (102) the indicators (103), the transporter (104), the printer (17), the buttons (13) and the lamps (130) are electrically connected.

Figure 4:
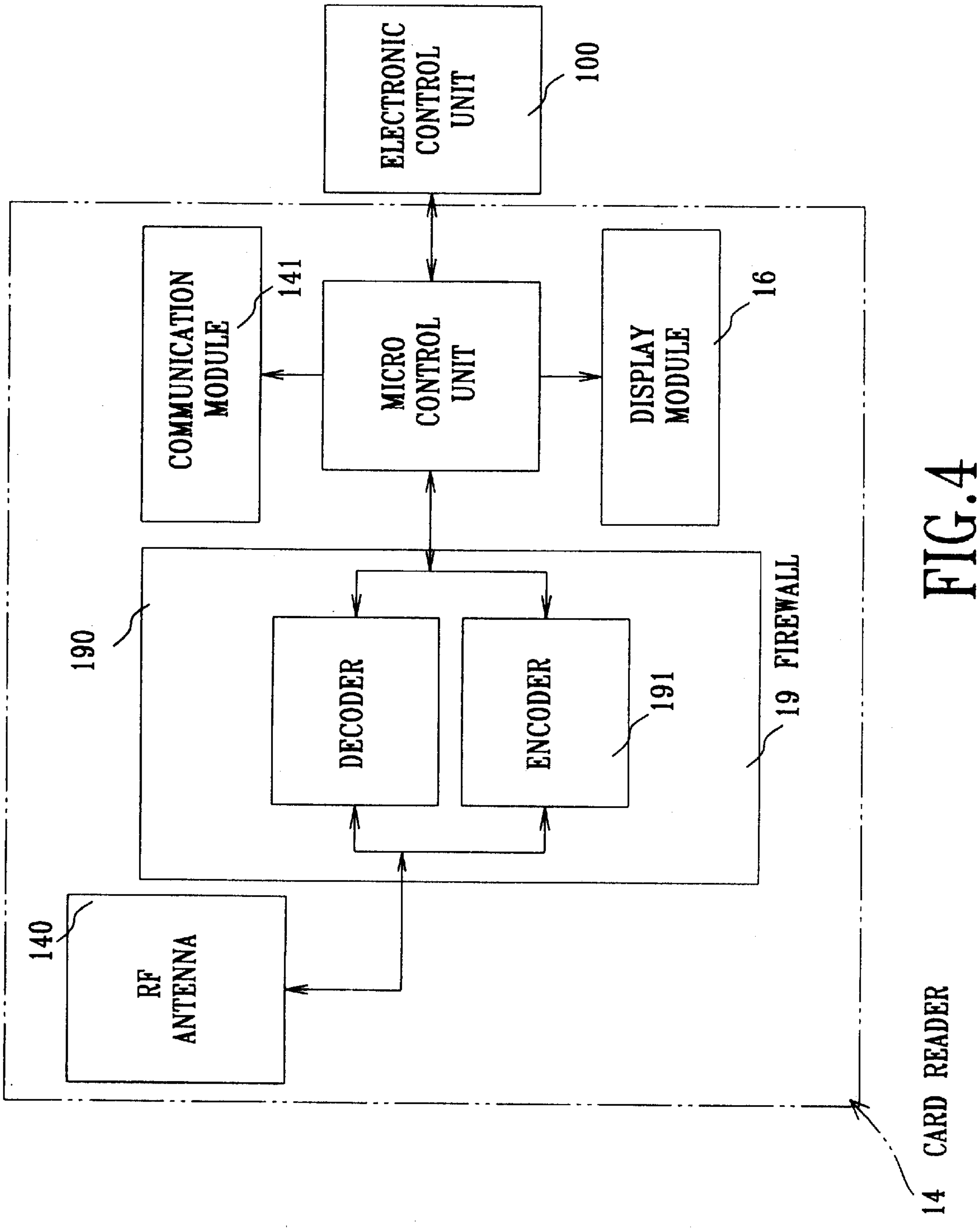
FIG. 4 is a diagram of an inductive card reader included in the vending machine of FIG. 1 to read information from and write information on the chip card.

With reference to FIG. 4, the card reader (14) includes a micro control unit (141), a communication module (142), a display module (16) and a "firewall" (19). The micro control unit (141) is electrically connected to the electronic control unit (100). The communication module (142) is electrically connected between the micro control unit (14) and a host computer (30) (see FIG. 3) in an administrative center. The display module (16) is electrically connected to the micro control unit (14) to control the operation of the display (160) shown in FIG. 1. and a "firewall" (19) electrically connected to the micro control unit (14). The inductive read/write head (140) is in turn electrically connected to the "firewall" (19).

The communication module (142) may communicate with the host computer (30) via a special telephone landline, or alternatively, by means of a modem via a telephone line, thereby keeping the operation of the vending machine under the control of the administrative center.

Figure 5:
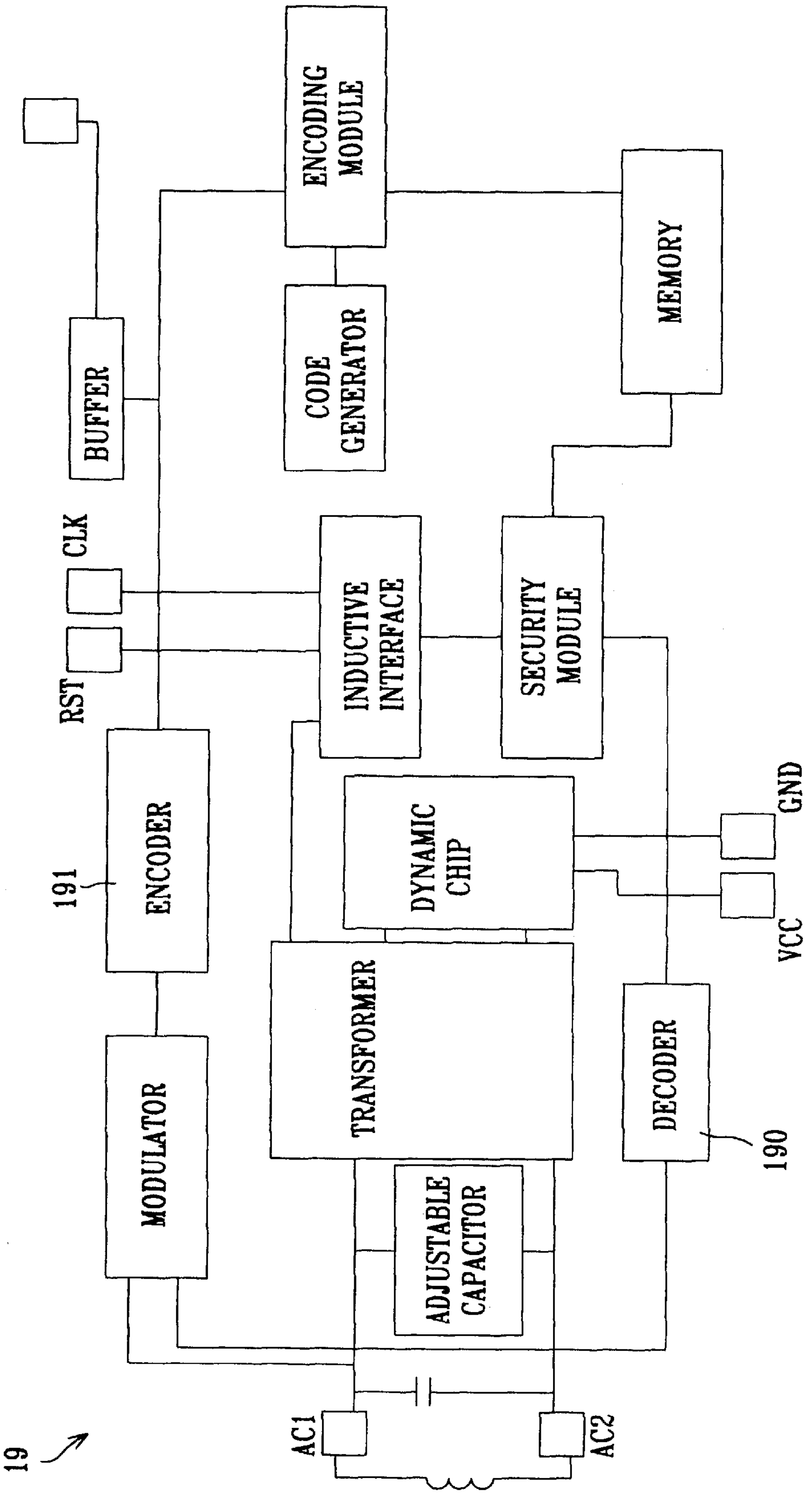
FIG. 5 is a functional block diagram of the inductive card reader in FIG. 4.

The "firewall" (19) includes a decoder (190) and an encoder (191). The decoder (190) is used to receive signal from the inductive read/write head (140) and send decoded signal to the micro control unit (141). The encoder (191) is used to receive signal from the micro control unit (141) and send an encoded signal to the inductive read/write head (140). The configuration of the "firewall" (19) is shown in FIG. 5 in more detail and will not be further described.

With reference to FIGS. 1 to 4, the vending machine can be operated by placing the chip card (20) in the stand (15). At this time the information recorded on the card (20) is read by the inductive read/write head (140) in a manner of induction. The resulting data from the head (140) is then received by the decoder (190), which in turn sends decoded data to the micro control unit (141). As the result of the decoded data, the sum of money recorded on the card (20) is shown on the display (160) under the control of the micro control unit (141).

In addition, some of the lamps (130) enclosed in the buttons (13) are lit up by the electronic control unit (100), indicating which goods (12) are available based on the sum of money recorded on the card (20). When one of the lit buttons (13) is pressed, a signal is sent from the button (13) to the electronic control unit (11) to order the transporter (104) to transfer the selected item of the goods (12) to the access bin (18).

Simultaneously, information about the price of the selected item of the goods (12) is transferred from the electronic control unit (100) to the micro control unit (141). After the micro control unit (141) operates, i.e. subtracts the price from the original sum of money, the remaining sum of money is sent from the unit (141) to the encoder (191), where the data is encoded. The encoded data is then sent to the inductive read/write head (140), which writes information about the remaining sum onto the chip card (20) by induction.

In general, the vending machine can be kept operating since it is always in touch with the administrative center through the communication module (142). Whenever the checker (102) detects that the vending machine has operating problems or an insufficient stock of the goods (12), information is sent from the electronic control unit (100) to the host computer (30) through the communication module (142). Clerks in the center dispatch repair personnel or stock personnel to deal with the appropriate problem.

The communication module (142) may be electrically connected to more that one vending machine (A, B, C, D), as shown in FIG. 3, to transfer information about all of the vending machines to the host computer (30), respectively or collectively.

When the checker (102) detects specific goods (12) to be out of stock, the electronic control unit (100) lights up the appropriate indicators (103) to indicate that these goods are out of stock and send the information from the electronic control unit (100) to the host computer (30).

From the foregoing description, it is noted that the vending machine in accordance with the present invention has many advantages, in comparison with the conventional vending machine, as listed below:

| | THE PRESENT INVENTION | CONVENTIONAL VENDING MACHINES |
|---|---|---|
| TROUBLES | | |
| Faults or failures at a coin-slot or a card-slot | Never | Yes |
| Inserting the cash card in the coin-slot or the card-slot | Never | Probably |
| Wearing out the card | Never | Yes |
| Using invalid coin or invalid cash card | Never | Yes |
| ADDITIONAL FUNCTIONS | | |
| Being suitable to more that one vending machine electronically connected together | Yes | No |
| Communication with the administrative center by itself | Yes | No |
| For the establishment of a self-service shop (?) | Easy | Difficult |
| Data encoder | Yes | No |
| Informing of troubles by itself | Yes | No |

It is to be understood, however, that even though numerous characteristics and advantages of the present invention have been set forth in the foregoing description, together With details of the structure and function of the invention, the disclosure is illustrative only. and changes may be made in detail, especially in matters of shape, size, and arrangement of parts within the principles of the invention to the full extent indicated by the broad general meaning of the terms in which the appended claims are expressed.

What is claimed is:

1. A vending machine operated by a chip card, comprising:
  - a housing having a window to display goods to be sold, multiple selection buttons associated with said goods, a display to show the sum of money recorded on said chip card, and an access bin from which said goods are obtained from said vending machine;
  - an electronic control unit for storing information about prices for said goods;
  - an inductive card reader for reading information from and writing information on said chip card by induction, wherein the inductive card reader comprises
    - a micro control unit electrically connected to said electronic control unit;
    - a communication module electrically connected between said micro control unit and a host computer in an administrative center;
    - a display module electrically connected to said micro control unit to control the operation of said display;
    - a firewall electrically connected to said micro control unit; and
    - an inductive read/write head electrically connected to said firewall for reading information from and writing information on said chip card by induction;
    - a checker for checking the stock of said goods;
    - a transporter for transferring said goods to said access bin;
    - multiple indicators to show what goods are out of stock; and
    - multiple lamps to show what goods can be selected based on the sum of money recorded on said chip card;

wherein said inductive card reader is electrically connected to said electronic control unit to which said checker, said transporter, said indicators, said buttons and said lamps are electrically connected.

2. The vending machine operated by a chip card as claimed in claim 1, wherein said communication module of said inductive card reader communicates with said host computer via a special telephone line.

3. The vending machine operated by a chip card as claimed in claim 1, wherein said communication module communicates with said host computer by a modem via a telephone line.

4. The vending machine operated by a chip card as claimed in claim 1, wherein said firewall has a decoder and an encoder, and said decoder is adapted to receive data from said inductive read/read head and send decoded data to said micro control unit, and said encoder is adapted to receive data from said micro control unit and send encoded data to said inductive read/read head.

5. The vending machine operated by a chip card as claimed in claim 4, wherein said housing has a stand for positioning said chip card in a location near said inductive card reader.

6. The vending machine operated by a chip card as claimed in claim 5, further including a printer electrically connected to said electronic control unit to print a receipt.

7. The vending machine operated by a chip card (20) as claimed in claim 6, wherein said housing (10) has a slot (171) through which said receipt (70) is ejected.

8. The vending machine operated by a chip card (20) as claimed in claim 1 further includes an external controller (101) electrically connected to said electronic control unit (100) via a cable to update the information stored in said electronic control unit (100).

* * * * *

UNITED STATES PATENT AND TRADEMARK OFFICE

CERTIFICATE OF CORRECTION

PATENT NO. : 6,304,796 B1
DATED : October 16, 2001
INVENTOR(S) : Linda Din

It is certified that error appears in the above-identified patent and that said Letters Patent is hereby corrected as shown below:

Title page,
Item [12] United States Patent
Din

Item [76], Inventor: Linda Din, 5 Fl., No. 43, Lane 50,
Yuantung St., Lungching Hsian,
Taichung Hsien (TW)

Signed and Sealed this

Twenty-sixth Day of March, 2002

*Attest:*

JAMES E. ROGAN

*Attesting Officer* *Director of the United States Patent and Trademark Office*

UNITED STATES PATENT AND TRADEMARK OFFICE
CERTIFICATE OF CORRECTION

PATENT NO. : 6,304,796 B1
DATED : October 16, 2001
INVENTOR(S) : Linda Din

It is certified that error appears in the above-identified patent and that said Letters Patent is hereby corrected as shown below:

Title page,
Item [12], should read
-- [12] United States Patent
Din --.

Item [76], should read
-- [76] Inventor: Linda Din, 5 Fl., No. 43, Lane 50,
Yuantung St., Lungching Hsian,
Taichung Hsien (TW) --.

This certificate supersedes Certificate of Correction issued March 26, 2002.

Signed and Sealed this

First Day of April, 2003

JAMES E. ROGAN
*Director of the United States Patent and Trademark Office*